United States Patent [19]

Keller

[11] Patent Number: 5,659,804
[45] Date of Patent: Aug. 19, 1997

[54] PANORAMIC CAMERA

[76] Inventor: James McNeel Keller, 121 Cedar St., San Antonio, Tex. 78210

[21] Appl. No.: 320,455

[22] Filed: Oct. 11, 1994

[51] Int. Cl.⁶ .......................... G03B 37/02; G03B 7/099
[52] U.S. Cl. .................................... 396/20; 396/268
[58] Field of Search ........................... 354/94, 95, 99, 354/430, 476, 482, 483; 396/20, 21, 24, 268, 275, 276, 233

[56] References Cited

U.S. PATENT DOCUMENTS

| Re. 27,236 | 11/1971 | Wight | 354/95 |
|---|---|---|---|
| 511,133 | 12/1893 | Fretwell | 354/95 |
| 687,592 | 11/1901 | Barnell | 354/95 |
| 2,794,379 | 6/1957 | McNeil | 354/95 |
| 2,863,713 | 12/1958 | Mito | 354/95 |
| 2,966,096 | 12/1960 | D'incerti et al. | 352/69 |
| 3,016,001 | 1/1962 | Sonne | 354/95 |
| 3,091,166 | 5/1963 | Norwood | 95/64 |
| 3,113,484 | 12/1963 | Baker | 352/70 |
| 3,141,397 | 7/1964 | McNeil | 354/99 |
| 3,214,232 | 10/1965 | Spear | 352/69 |
| 3,221,625 | 12/1965 | Leighton | 354/94 |
| 3,246,588 | 4/1966 | Waroux | 354/94 |
| 3,286,097 | 11/1966 | Norwood | 250/209 |
| 3,311,038 | 3/1967 | Cummins | 354/95 |
| 3,468,229 | 9/1969 | Bellows | 354/95 |
| 3,479,939 | 11/1969 | Jones | 354/410 |
| 3,532,039 | 10/1970 | Rising | 354/71 |
| 3,784,277 | 1/1974 | Baker | 359/211 |
| 4,943,821 | 7/1990 | Gelphman et al. | 354/99 |
| 5,260,739 | 11/1993 | Nagata | 354/430 |
| 5,298,935 | 3/1994 | Nagata | 354/430 |
| 5,335,042 | 8/1994 | Imafuji et al. | 354/95 |

*Primary Examiner*—Safet Metjahic
*Assistant Examiner*—John Chizmar
*Attorney, Agent, or Firm*—Albert Peter Durigon

[57] ABSTRACT

A panoramic camera has a camera housing rotatable about an axis of rotation that defines a viewpoint which points along a radial optical path that object rays traverse as the camera is rotated about its axis; a lens assembly having an optical path and a front nodal point mounted for rotation with the camera housing with the optical path of the lens offset from the radial optical path; a specular assembly including an object specular member along the radial optical path mounted for rotation with the housing that cooperates with the lens assembly for gathering object rays that traverse the radial optical path and for deviating them along the optical path of the lens assembly in such a way that the front nodal point of the lens subassembly virtually appears to lie on the axis of rotation thereby eliminating image smearing; and has an ambient light responsive controller including an ambient light sensor mounted for rotation with the camera housing for automatically varying the speed of rotation in direct relation to the magnitude of the ambient light thereby eliminating both under- and over-exposure. Means are disclosed for allowing the selection of different near- and far-field object distances and for allowing framing (both vertical and angular) of the panoramic subject. In one embodiment, the specular assembly has object and lens mirrors that pivot between open and closed positions. Different embodiments have film or digital image recording devices.

11 Claims, 6 Drawing Sheets

PANORAMIC CAMERA

FIELD OF THE INVENTION

This invention is drawn to the field of photography, and more particularly, to a novel panoramic camera.

BACKGROUND OF THE INVENTION

Panoramic cameras are called upon to provide images over three hundred and sixty (360) degrees of selected near and far-field subjects in such a manner that the images recorded thereby are substantially free from smearing as the camera pans the subject and are neither underexposed nor overexposed given the way the ambient light illuminating the subject may vary at different angular positions about the three hundred and sixty degree pan. To provide the ability to select which vertical portion of the subject is to be recorded, provision should be made to allow for framing of the subject. To provide the ability to select the extent of the subject that is to be recorded, provision should be made to allow for the use of different field (or angle) of view lenses, such as fisheye, wide angle, normal and telephoto lenses. If, in addition, such a camera were portable, ragged, reliable, easy to use, inexpensive, compact, and lightweight, it would appeal both to amateur and professional photographers alike.

A periscope-type panorama camera that addresses the problem of image smearing is disclosed by McNeil in U.S. Pat. No. 2,794,379. It includes a cylindrical camera body having spaced apart top and bottom circularly shaped walls that are joined by a cylindrical side wall to provide a light tight enclosure. Film is wrapped along the inside of the cylindrical focal plane of the side wall and a film guide and an advance mechanism are provided to guide and advance the film about the cylindrical focal plane after each exposure.

The top wall is journaled for rotation within the cylindrical side wall and has a central post that is keyed to a motor driven axle located at the center of the cylindrical camera body. As the axle is turned by a motor or other mechanism, the top plate rotates about the axis of rotation of the axle relative to the cylindrical side wall.

A periscope assembly defining an optical axis is mounted for rotation with the rotatable top plate of the cylindrical camera body such that its optical axis is parallel to, radially displaced from and contained in a plane common to it and the central axis of rotation. The periscope includes a lens. First and second mirrors each to either side of the lens are adjustably aligned along the optical axis to place its nodal points on the axis of rotation for a given focal length and object distance.

The lens is mounted in an aperture provided in the top wall of the cylindrical camera body. The focal length of the lens is made equal to the radius of the cylindrical side wall of the camera body. The radius of the cylindrical side wall defines the focal length of the lens. For different focal lengths differently sized housings are required.

The first mirror of the periscope assembly (below the lens) is mounted at forty five degrees to the optical axis in the camera body so as to confront the rear nodal point of the lens and the cylindrical focal plane. Both the lens and the first mirror must be separately adjusted to align the virtual image of the rear nodal point on the axis of rotation. To do so, the first mirror is axially adjusted along the optical axis until it squarely confronts the cylindrical focal plane and is permanently keyed into position. The lens is then axially adjusted in its mounting aperture until the distance between its rear nodal point and the first mirror equals the distance by which the optical and rotational axes are displaced. These adjustments are laborious and time consuming and require that the cylindrical body be disassembled.

The second mirror of the periscope assembly (above the lens) in one embodiment is a roof prism that is mounted outside the camera body confronting both the front nodal point of the lens and the subject. The roof prism is required to reverse the image. In an alternative embodiment, a mirror is substituted for the roof prism and a relay lens is required to reverse the image. In either embodiment, the element is axially adjusted until the distance between it and the front nodal point of the lens is such that the virtual image of the front nodal point of the lens appears to lie on the axis of rotation.

To provide for different fields of view, differently sized mirrors and/or lenses would need to be implemented. The change in the size of the first mirror might require a different radial offset between the optical and rotational axes. Thus a different, specially constructed camera body would be required. The change in the focal length of the lens could also require a differently sized cylindrical side wall. Again, a specially constructed camera body would be required. The roof prism, or second mirror in the alternate embodiment, excludes a wide angle of view because the optical path is folded across the orientation of the exposure slit. For the mirror embodiment, where the relay lens is required to reverse the image, the angle of view is further limited because the combination of lenses excludes far off-axis rays.

No provision is made, or able to be made, for framing the subject. To provide for different object distances for a given focal length, the housing as well as the periscope assembly would need to be disassembled, and two adjustments made for the first mirror and a third adjustment made for the second mirror to re-effect the alignments of the virtual positions of the front and rear nodal points of the lens onto the actual axis of rotation. No provision is made for the effects of varying ambient lighting conditions as the camera pans the subject.

An underwater panoramic camera that addresses the problem of image smearing given an object distance and fixed focal length is disclosed by McNeil in U.S. Pat. No. 3,141,397. The camera includes a cylindrical camera body having circular top and bottom plates that are joined by an annular lens that constitutes the side wall of the cylindrical camera body. An arm having a radially extending lens barrel defining an optical axis on one side and a film guide and feed assembly on its other side is rotatably mounted in the cylindrical camera body such that as the lens barrel end of the arm is turned about the axis of rotation in one angular direction the film guide and feed assembly on the other side of the arm advances film in the opposite angular direction.

The in-line lens system, which includes the expensive and fragile annular lens of the cylindrical side wall of the camera body and the optical elements of the in-line lens barrel itself, provides a fixed focal length and a given object distance. To prevent smearing as the in-line barrel pans for a fixed focus and given object distance, the center of rotation of the arm is positioned so that the ratio of the eccentricities of the front and rear nodal points of the lens is made equal to the ratio of the object distance to the image distance.

There is, however, appreciable smearing for subjects at other object distances. To prevent smearing for subjects at other object distances, the housing needs to be disassembled and another in-line lens assembly with the proscribed center of rotation for each different given object distance installed. In addition, no provision is made, or able to be made, for changing the framing of the subject, and no provision is made, or able to be made, for changing the field of view.

The radial dimension of the cylindrical housing body depends on the fixed focal length of the lens. Different focal lengths would thus require different, specially manufactured housing bodies. No provision is made for the effects of varying ambient light as the camera pans.

An in-line panoramic camera with an off-axis lens that addresses the problem of image smearing is disclosed by Cummins in U.S. Pat. No. 3,311,038. The camera is like that of the '397 patent except that it has a stationary film guide and advance assembly defining an image surface and has an arcuate, cylindrical-segment lens that constitutes but a part of the side wall of the camera. As in the '397 patent, the in-line barrel lens is rotated about a preselected point (center of rotation) that is between the front and rear nodal points of the lens selected such that the ratio of the eccentricities of the front and rear nodal points is made equal to the ratio of the object distance to the image distance for a given object distance and focal length.

In one embodiment where the rear nodal point of the lens confronts the image surface, a pair of mirrors is provided therebetween that decreases the distance from the center of rotation of the arm of the in-line lens to the image surface by an amount that equals the eccentricity of the rear nodal point from the point of rotation of the lens, and in another embodiment where the front nodal point confronts the image surface, a prism is provided therebetween that increases the distance from the center of rotation of the arm to the focal surface by an amount that equals the eccentricity of the rear nodal point. In either embodiment, however, different, specially designed and manufactured lens assemblies need to be provided for different given object distances. The focal length of the lens is made equal to the radius of the stationary film guide and feed assembly. Different, specially constructed housing bodies are required for different focal lengths. No provision is made, nor is able to be made, for changing the field of view and/or the framing of the subject. No provision is made that accounts for the effects of varying ambient light conditions.

An in-line and fixed focus panoramic camera that addresses the problem of controlling exposure for the way the light varies about a panoramic subject is disclosed by Waroux in U.S. Pat. No. 3,246,588. In one embodiment, single panoramic images are provided and in another stereo panoramic images. In either embodiment, an in-line lens subassembly having a fixed focus and an optical axis is mounted for rotation with a camera housing with its optical axis offset from a stationary drum of a film guide and feed subassembly that is journaled for rotation about the axis of the camera housing. In either embodiment, no provision is made to take account of the blurring that results from the offset of the optical axis of the lens subassembly from the axis of rotation and no provision is made for framing, for different focal lengths and their correspondingly different fields (angle) of view, or for selectable near- and far-field object distances.

To control exposure, in one embodiment one of one or more cams having differently shaped profiles and/or a cam of variable profile is pre-selected to drive the camera housing about its axis of rotation with a speed that corresponds to the profile of the cam selected. In this embodiment, the cam that is pre-selected is the one that is judged best in the field to match the prevailing lighting conditions. In another embodiment, the cam that is selected is set to control the size of the diaphragm of the lens subassembly rather than the speed of rotation. Again, once selected, the way the diaphragm is varied with angle is pre-set. In a further embodiment, a light meter is used to change either the speed or the size of the diaphragm point-to-point.

SUMMARY OF THE INVENTION

It is accordingly the principal object of the present invention to provide a panoramic camera that is portable, rugged, reliable, easy to use, inexpensive and compact, lightweight and suitable for use for both amateur and professional photographers alike; that provides smear-free images as it pans about a three hundred and sixty (360) degree arc; that may be readily adjusted to accommodate both near- and far-field subjects; that may be readily adjusted to provide selected framing and to accommodate different selectable fields (angle) of view including very wide vertical angle lenses; and that automatically and continually adjusts for varying ambient light conditions as the camera pans different angular portions of the three hundred and sixty degree subject.

The panoramic camera of the present invention includes a camera housing having a front wall and a rear wall. An axle defining an axis of rotation is mounted in said camera housing. Means are coupled to said axle and said housing for rotating the housing about said axis of rotation of said axle such that object rays from the panoramic subject traverse a radial optical path that extends generally perpendicularly between said axis of rotation and that portion of the panoramic subject confronting said front wall of the camera housing as the camera housing is rotated about said axis of rotation.

A lens subassembly defining an optical axis and having front and rear nodal points and a focal length is mounted at a predetermined position for rotation with said camera housing determined such that the lens subassembly is remote from said axle with its optical axis in a plane different from any plane that contains said axis of rotation and with its optical axis offset from said radial optical path that said object rays traverse and at a predetermined orientation thereto. In one embodiment, the orientation is a parallel orientation and in another it is a perpendicular one.

A specular subassembly means having an optical train including an object specular member is mounted for rotation with said housing body for gathering said object rays that traverse said radial optical path and for deviating the same along said optical path of said lens assembly that is offset from said radial optical path in such a way that said front nodal point of said lens subassembly appears to virtually lie on said axis of rotation. In one embodiment, the specular subassembly includes a lens specular member as well as the object specular member, where the object and lens specular members are mounted for rotation with the front wall of the camera housing with the object specular member lying on said radial optical path and confronting the lens specular member and with the lens specular member lying on the optical axis of the lens subassembly and confronting both the object specular member and the lens subassembly. Means coupled between the members and the housing move the mirrors between closed and open positions. In another embodiment, the object specular member is mounted inside the camera housing along both said radial optical path and said optical path of said lens subassembly and confronting both the subject and the lens subassembly. In either embodiment, there is no smearing of the image as the camera pans the subject because, from the subjects point of view, the lens subassembly appears to rotate about its front nodal point.

Means having an imaging surface are mounted for rotation with said camera housing in such position that said imaging surface is remote from said axle and confronts the rear nodal point of said lens subassembly for recording images of said panoramic subject imaged thereto by said lens subassembly. In one embodiment, the recording means includes film and a cooperative film guide and advance mechanism and in another embodiment it includes a digital recording device.

A light sensor means is mounted to at least one of said front and rear walls of said camera housing for providing at least one signal representative of ambient light intensity. In alternate embodiments, the light sensor means includes a reflected light sensor mounted to the front wall of the camera housing, an incident light sensor mounted to the rear wall of the camera housing, and a reflected light sensor and an incident light sensor mounted respectively to the front and rear walls of the camera housing. Means are mounted to said camera housing responsive to said at least one signal and coupled to said rotation means for continually varying automatically the speed of rotation of said housing about said axis of rotation in direct relation to the magnitude of said at least one signal. Because the resulting exposure duration is continually varied inversely to the intensity of the ambient light, both under- and over-exposures are thereby automatically eliminated. By regulating the speed by the incident light generated signal, rather than by the reflected light generated signal, abrupt variations in scene luminance cause neither abrupt shifts in speed nor the consequent exposure banding at the transition points.

First means are mounted for rotation with the camera housing for adjusting the lateral spacing between said imaging surface of said image recording means and said rear nodal point of said lens subassembly and second means are mounted for rotation with said camera housing for adjusting the vertical spacing between said imaging surface of said image recording means and said rear nodal point of said lens subassembly. The first adjustment means enables to select any focal length lens and corresponding field of view and to select that image distance that corresponds to any selected near- and far-field object distance for a given focal length without re-configuring the camera housing. The second adjustment means enables to provide framing, i.e., a selected vertical shift of the image relative to its horizon.

BRIEF DESCRIPTION OF THE DRAWINGS

Other objects, aspects and advantageous features of the present invention will become apparent as the invention becomes better understood by referring to the following detailed description of the preferred embodiments thereof and to the drawings, wherein.

DETAILED DESCRIPTION OF THE PREFERRED EMBODIMENTS

Figure 1A:
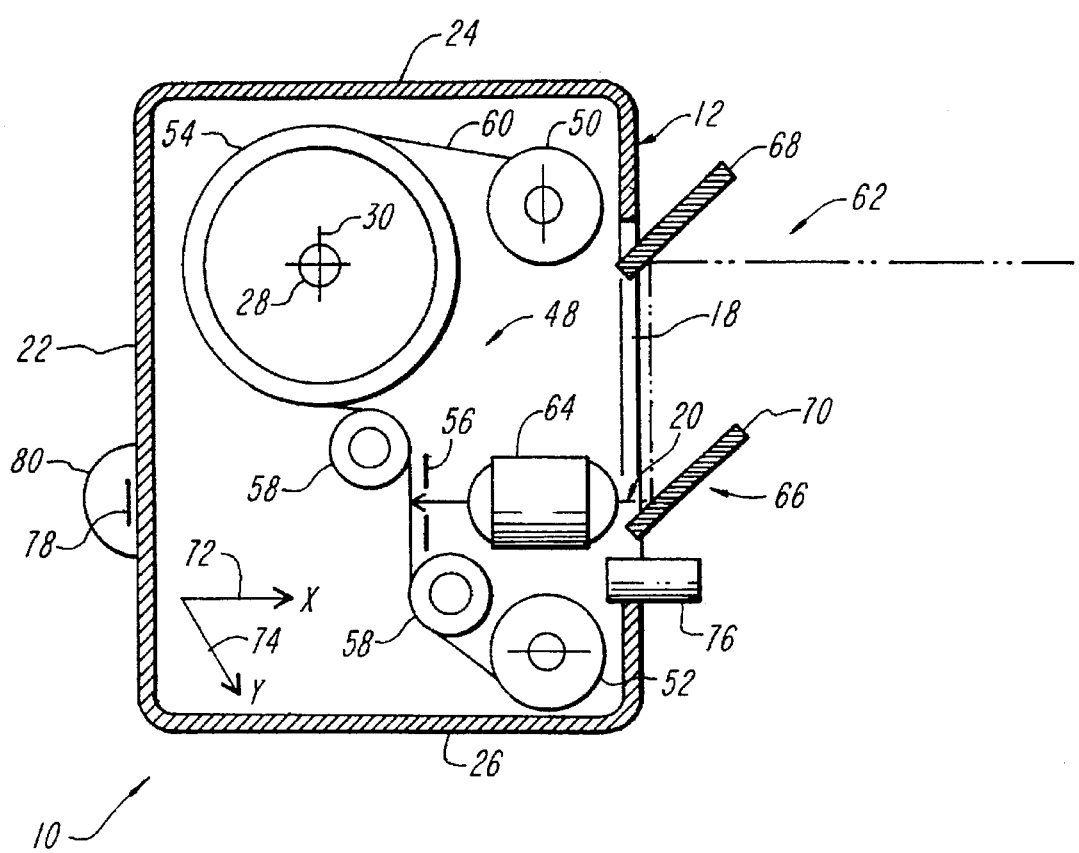
FIG. 1 is a schematic cross-sectional view in the FIG. 1A thereof and is a schematic perspective view in the FIG. 1B thereof of a panoramic camera in accord with the present invention illustrating it in one of its presently preferred embodiments.
Figure 1B:
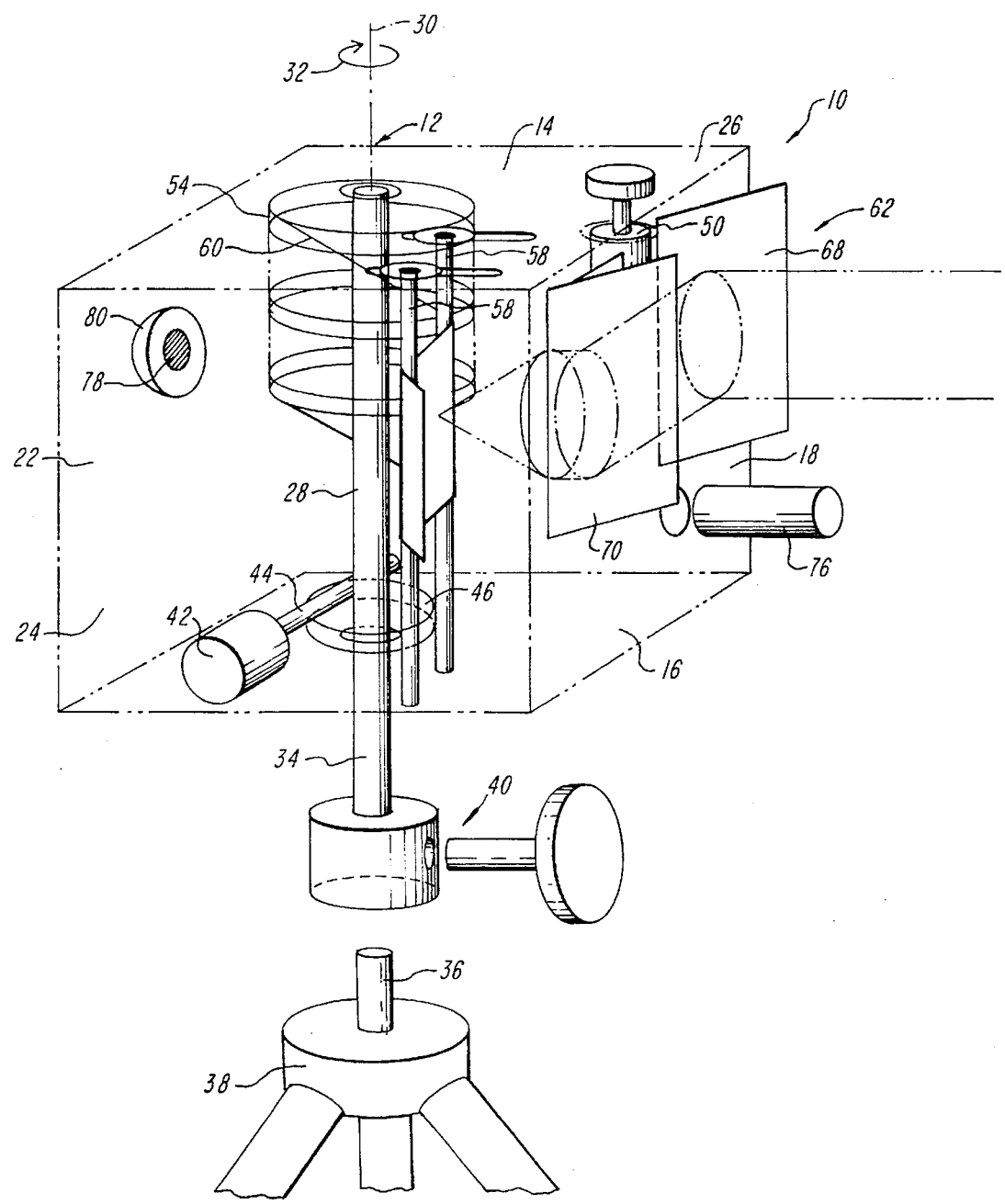

Referring now to FIG. 1, generally designated at 10 is one presently preferred embodiment of a panoramic camera in accord with the present invention. The camera 10 includes a housing generally designated 12 having a top wall 14 (FIG. 1B), a bottom wall 16 (FIG. 1B), a front wall 18 having an aperture therethrough generally designated 20, a back wall 22, and opposing side walls 24,26. Any other suitable housing body having a front and providing a light-tight enclosure may be employed without departing from the inventive concepts.

The housing 12 is journaled for rotation about a vertical axle 28 preferably by bearings provided therefor in the top and bottom walls 14, 16 thereof. The axle 28, which extends between the top and bottom wall 14,16, provides a rigid support about which the camera rotates about an axis of rotation 30 as illustrated by an arrow 32 (FIG. 1B). The axle 28 has an end 34 (FIG. 1B) that extends beyond the bottom wall 16 of the camera housing 12. The end 34 is mounted to a telescoping shaft 36 of a tripod or other camera support 38 by a releasable lock assembly generally designated 40 (FIG. 1B) or other suitable means.

A motor 42 having a worm gear 44 mounted to its shaft is mounted for rotation with the bottom wall 16 of the housing. A worm wheel gear 46 is concentrically mounted to the axle 28. As the shaft of the motor 42 turns, the drive spindle of the worm gear 44 turns the teeth of the gear 46, which rotates the bottom wall 16 about the axle 28 and, with it, the camera housing 12 about the axis of rotation 30. Any suitable means other than rotating the camera housing for panning the subject may be employed, such as rotating a lens and therewith its viewpoint and/or rotating a mirror or other specular assembly, although the presently preferred embodiment enjoys the advantage, among others, that the axle and the drive drum to be described mounted for rotation therewith may be readily replaced with an axle having a drive drum of another radius to accommodate lenses of various focal lengths and thereby provide any selected vertical field of view. In addition, by having the drive drum rigidly and directly linked to the worm wheel via the axle, only one gear interface is needed to rotate the housing, which enjoys not only the advantages of being light in weight, reliable and inexpensive but also minimizes gear backlash and therewith exposure irregularities in the form of banding.

A film guide and feed assembly generally designated 48 is mounted inside the camera housing 12. The assembly 48 includes film supply spool 50 and take-up mechanism 52, a film drive drum 54, an exposure slit 56 and a pair of film guide rollers 58. Film 60 released by the film supply mechanism 50 is threaded over the drum 54 through the guide rollers 58 past the exposure slit 56 and into the film take-up mechanism 52. The drive drum is mounted concentric with and fixed to the axle 28 so that it remains stationary as the housing 12 is mined about the axis of rotation 30 by the motor 42. As the housing 12 rotates about the drum 54, the film 60 is moved past the exposure slit 56 with a linear velocity that depends on the radius of the drive drum 54 and the angular velocity of the panoramic swing of the camera housing 12 about the axis of rotation 30.

An optical assembly generally designated 62 is mounted for rotation with the camera housing 12. The assembly 62 includes a lens subassembly 64 and a specular subassembly generally designated 66, both mounted for rotation with the camera housing 12. The lens subassembly defines an optical axis, has front and rear nodal points and a focal length and it is mounted inside the housing 12 with its from nodal point confronting the aperture 20 and with its rear nodal point confronting the exposure slit 56 of the film feed and guide assembly 48. The specular subassembly 66 includes an object mirror 68 and a lens mirror 70 spaced from the object mirror 68, which are mounted for pivotal movement to the outside of the from wall 18 of the housing 12 in a manner to be described. An optical path from the object mirror 68 to the lens subassembly 64 is provided by the mirror 68, which confronts the mirror 70 and the object, and by the mirror 70, which confronts both the front nodal point of the lens subassembly 64 and the object mirror 68. Although discrete mirrors 68,70 are illustrated, any specular subassembly that provides the same optical path, such as a monolithic optical element, may be employed. The specular subassembly and/ or lens subassembly may be positioned outside or inside the camera housing alternately without departing from the inventive concepts.

A slide mechanism illustrated schematically by arrow 72 marked "X" is coupled between each of the rollers of the pair of rollers 58 and the housing 12 to slidably adjust their position towards and away from the rear nodal point of the lens subassembly 64 in the "X" direction and to secure them in any position selected. A slide mechanism schematically illustrated by arrow 74 and marked "Y" is coupled between the lens subassembly 64 and the housing 12 for adjusting the position of the lens subassembly 64 vertically in the "Y" direction (in/out of the page).

In the illustrated embodiment, the drive drum 54 on the one band and the guide rollers 58 and lens subassembly 64 on the other are mounted in the housing body towards opposing sides thereof, which provides the clearance that allows interference-free adjustment of the slide mechanisms 72,74, although it will be appreciated that other offset spacing may be employed without departing from the inventive concepts so long as there is sufficient clearance between the guide rollers, the drive drum and axle, and between the lens subassembly and the drive drum and axle, so as to allow interference-free adjustment of the X,Y slide mechanisms 72,74. It will be appreciated that any suitable mechanisms may be employed to adjust the relative spacing between the guide rollers and the lens subassembly in the "X" and "Y" directions without departing from the inventive concepts.

To ensure perfect synchronization of image speed and film advance, the radius of the drive drum 54 of the film guide and feed assembly 48 is selected to be equal in magnitude to the focal length of the lens subassembly 64. The offset placement of the drive drum position and of the lens subassembly position enables to accept different focal length lenses and drive drums with commensurate radii without re-configuring the camera housing for each different focal length selected. Wide angle, normal and other focal length lens subassemblies may thereby be readily accommodated without re-designing the camera housing 12. It should be noted that a pair of symmetrically stepped drums, not shown, may be employed, where each different step corresponds to another focal length lens or object distance that may be selected. The offset placement provides the clearance that enables the use of the symmetrically stepped drive drums.

To provide smearing-free exposure of the film 60 as the camera housing 12 rotates about the axis of rotation 30, the lens subassembly 64 is positioned with its rear nodal point spaced from the film a distance that corresponds to the focal length of the lens subassembly and with its front nodal point spaced from the object mirror 68 along the optical path of the specular subassembly 66 a distance that corresponds to the distance from the object mirror 68 to the axis of rotation 30 of the camera housing 12. With this arrangement, the front nodal point of the lens subassembly 64 virtually appears, from the point of view of the subject, to lie on the axis of rotation 30. The image of the subject on the film 60 thereby appears to be stationary during the time it takes a given point on the film 60 to traverse the exposure slit 56, thereby providing smearing-free exposure of the film 60 as the camera housing 12 is rotated irregardless of object distance.

To accommodate different near- and far-field subjects at any selected object distance, the film guide roller slide mechanisms 72 are laterally spaced from the lens subassembly 64 at that image distance that corresponds to the object distance selected. For any near-and far-field object distance selected, smearing-free exposure of the film 60 is thereby provided at the corresponding image distance without re-designing the camera housing 12. For large changes of focus, a drive drum of the appropriate radius, or a different step on the symmetrically stepped drive drums, may be readily used without re-configuring the camera housing.

A reflected light sensor 76, such as a narrow angle of acceptance photocell, is mounted to the front wall 18 of the camera housing 12 and an incident light sensor 78, such as a photocell, is mounted to the back wall 18 of the camera housing 12 under a diffusion dome 80. The sensors 76,78 alone and in combination cooperate with an ambient light responsive controller to be described to vary the exposure time of the film 60 in dependence on the variation in ambient lighting conditions encountered across a typical panoramic scene thereby preventing both trader- and over-exposure of the film.

Referring now to FIG. 2, the specular subassembly 66 of the optical assembly 62 in the presently preferred embodiment is mounted to the outside of the front wall 18 of the camera housing 12 such that the object and lens specular members 68,70 thereof are movable between closed and open positions. The lateral edge of the member 68 remote from the aperture 20 is rotatably mounted on an axle 82 for pivoting motion about the front wall 18, and the lateral edge of the member 70 proximate the aperture 20 is rotatably mounted on an axle 84 for pivoting motion about the front wall 18. The opposing lateral edges of a cover/baffle plate 86 are pivotally mounted to respective ones of the pivotally swinging edges of the members 68,70 via axles 88,90. An indexing plate 92 is rotatably mounted on an axle 94 for pivoting motion about the top wall 14 of the housing 12. Torsion springs, not shown, are mounted about the axles 82,84,94 for biasing the members 68,70 in their normally open conditions where they pivot out from the front wall 18 of the housing 12 and for biasing the indexing plate 92 in its normally closed condition where it lies flat against the top wall 14 of the housing 12 (FIG. 2A). A lens cover plate 96 extends beyond the lateral edge of the object mirror 68 a distance that allows it to cover the confronting face of the lens subassembly 64.

Figure 2A:
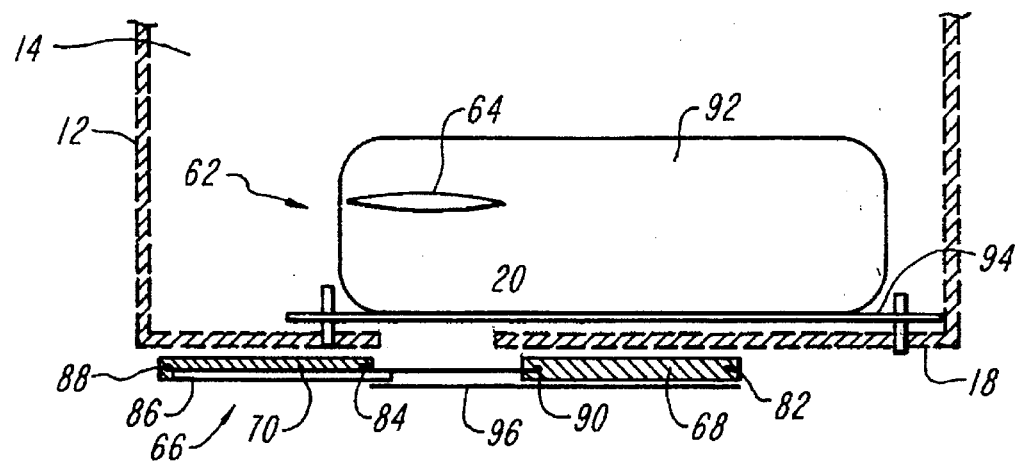
FIG. 2 illustrates schematic plan views in the FIGS. 2A,2B thereof and illustrates pictorial front views in the FIGS. 2C,2D thereof that are useful in explaining the operation of the embodiment of the optical assembly of FIG. 1.
Figure 2C:
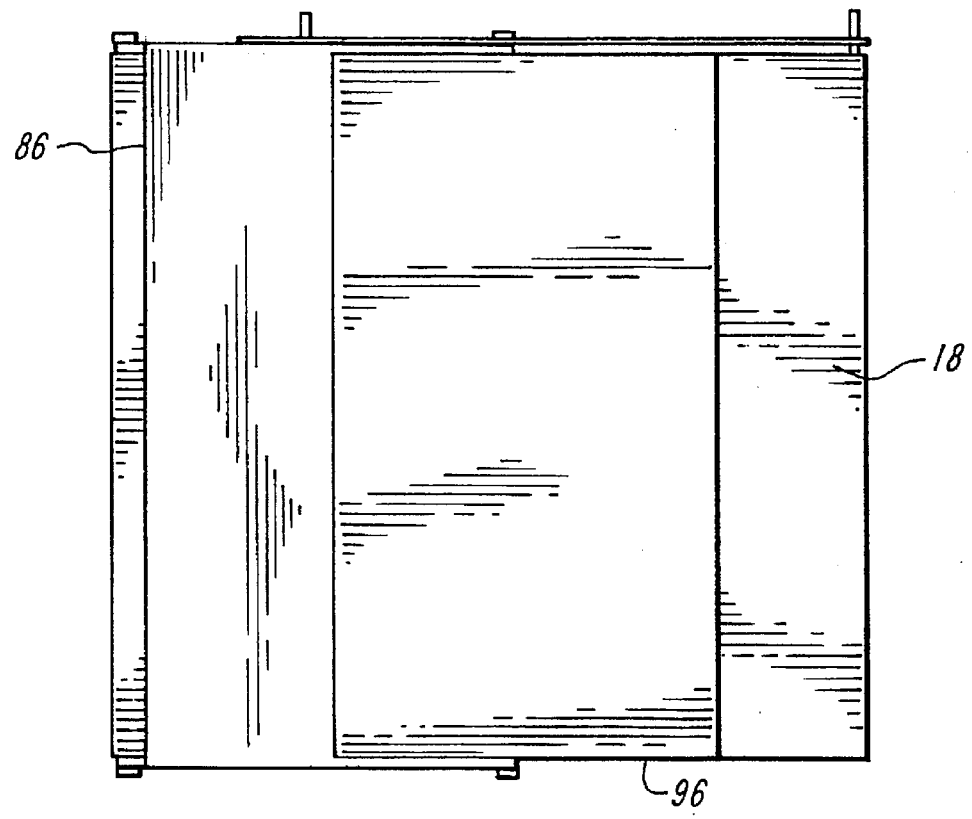

In the normally closed condition of the specular subassembly 66, the cover/baffle plate 86 protects the specular surface of the lens minor 70, the lens cover 96 covers the aperture 20 and lens subassembly 64, and the mirrors 68,70 lie flat against the front wall 18 of the housing as best seen in FIGS. 2A,2C. In their closed condition, the mirrors 68,70 are locked against the front wall of the camera housing by a releasable clamp, not shown.

Figure 2B:
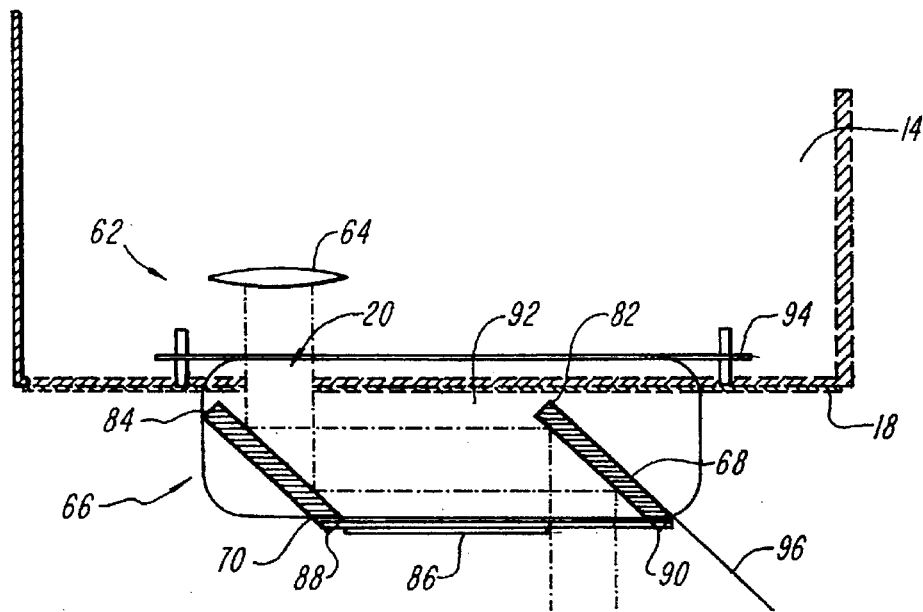
Figure 2D:
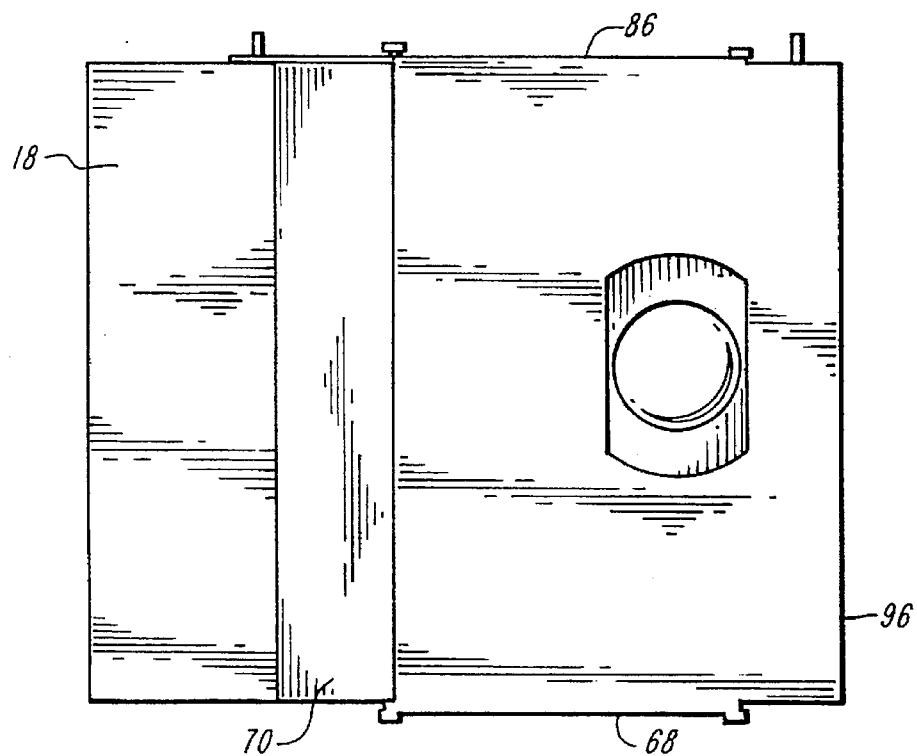

To open the specular subassembly 66, the clamp is released and the resilience of the torsion springs mounted to the axles 82,84 swings the mirrors 68,70 to their open position, while the indexing plate 92 is simultaneously pulled to overcome the resilience of the torsion spring mounted to the axle 94 and to swing it away from its normally closed position. The indexing plate 92 is then positioned over the members 68,70. The mirrors 68,70 have projecting tabs which abut the indexing plate 92, locking them in their use condition as best seen in FIGS. 2B,2D.

In the open condition of the specular subassembly 66, cover/baffle plate 86 acts as a light baffle, and the indexing plate 92 functions as a shade preventing ghosting and glare.

To return the specular subassembly 66 to its closed condition, the mirrors 68,70 are sprung against their bias to release the indexing plate 92, the plate 92 is lifted out of engagement with the specular subassembly and returned to its normally closed position while the lens cover 96 is pivoted to force the specular members 68,70 to return to their closed position where they are clamped. Any other suitable mechanism may be employed to move the mirrors between their open and closed positions.

Figure 3:
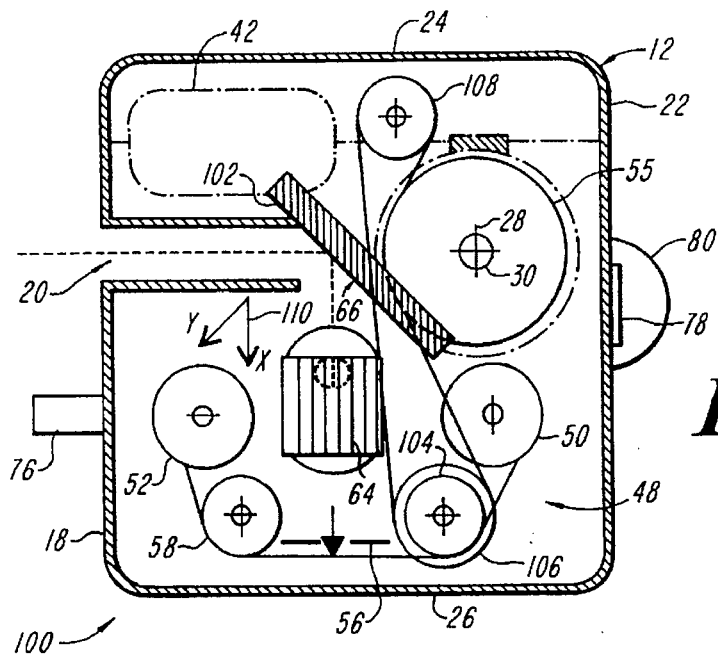
FIG. 3 is a schematic cross-sectional view of a panoramic camera in accord with the present invention illustrating it in another of its presently preferred embodiments.

Referring now to FIG. 3, generally designated at 100 is another presently preferred embodiment of a panoramic camera in accord with the present invention. Identical components bear the same numerals as the embodiment 10 of FIG. 1 and are not described again for the sake of brevity of disclosure. The embodiment 100 differs from the embodiment 10 in three principal respects. The specular subassembly 66 consists of a single object/lens member 102 that is mounted for rotation with the housing 12 inside of the camera 100 with its specular surface confronting both the object through aperture 20 thereof and the lens subassembly 64. As the second respect, one of the guide rollers 58 of the film feed and guide assembly 48 is constituted as a film drive drum 104 of radius "rf" and a film drive pulley 106 of radius "rp". The pulley 106 is turned by a belt that loops around pulley 106 and a pulley 108, which belt is driven by a stationary pulley 55 as the housing 12 is rotated about the axis 30. The pulley 55 is mounted to the axle 28 so that it remains stationary as the housing 12 is mined about the axis 30 by the motor 42. The stationary pulley 55 has a radius "rs". The focal length of the lens subassembly 64 and the radii of the drum 104 and pulleys 55,106 are selected to satisfy the relation "f/rf=rs/rp" in order to synchronize film advance and camera angular velocity and thereby prevent image smearing for any focal length "f" that may be selected. As the third respect, the lens subassembly 64 is mounted for sliding motion towards and away from the exposure slit 56 in an "X" direction to provide that image distance that corresponds to any selected near- and far-field object distance selected and is mounted for sliding motion along a "Y" direction perpendicular to the plane of the page to provide for framing of the object as schematically illustrated by crossed arrows 110 marked "X" and "Y". Any suitable slide mechanism may be employed without departing from the inventive concepts.

As in the embodiment 10 of FIG. 1, the distance along the optical path of the specular subassembly from the object mirror 102 to the front nodal point of the lens subassembly 64 is made equal to the distance from the object/lens mirror 102 to the axis of rotation 30 of the camera 100 to prevent smearing of images as the camera is rotated irregardless of object distance.

The drive pulley 55 and the lens subassembly 64 are mounted towards laterally opposing sides of the camera housing to provide the clearance that enables interference-free adjustment of the X and/or Y slide mechanisms 110 to provide the image distance that corresponds to any selected near- and far-field object distance and that enables to accept any radii for the drum 104 and pulleys 55,106 that correspond to a given focal length of the lens subassembly without re-configuring the camera housing 12. In addition, the clearance enables to accept the pair of symmetrically opposing stepped drive drums.

Figure 4:
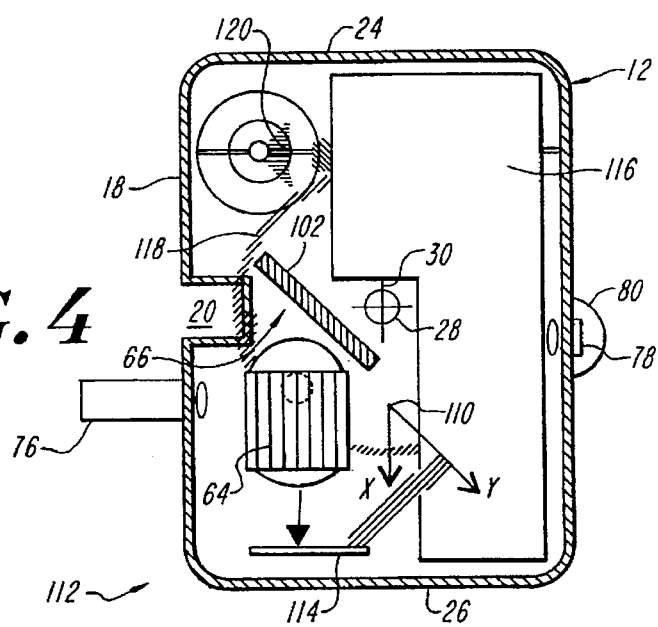
FIG. 4 is a schematic cross-sectional view of a panoramic camera in accord with the present invention illustrating it in yet another of its presently preferred embodiments.

Referring now to FIG. 4, generally designated at 112 is another presently preferred embodiment of a panoramic camera in accord with the present invention. Identical components bear the same numerals as the embodiment 100 of FIG. 3 and are not described again for the sake of brevity of disclosure. The embodiment 110 differs from the embodiment 100 in two principal respects. As the first respect, the film feed and guide assembly 48 (FIG. 3) is replaced by a digital recording device 114, such as a single-row charge coupled device and its associated electronics package 116, mounted for rotation with the housing 12 of the camera 112. As the second respect, a stationary worm wheel gear 118 is mounted concentric with and fixed to the axle 28 and is driven by a motor having a worm gear 120.

As in the embodiment 100 of FIG. 3, the distance along the optical path of the specular subassembly 66 from the object/lens mirror 102 to the front nodal point of the lens subassembly 64 is made equal to the distance from the object/lens mirror 102 to the axis of rotation 30 of the camera 112 to prevent smearing of images as the camera is rotated irregardless of object distance. The electronics package on the one hand and the lens subassembly 64 on the other are mounted towards laterally opposing sides of the camera housing to provide the clearance that enables interference-free adjustment of the X,Y mechanism(s) 110 to provide the image distance that corresponds to any selected near- and far-field object distance in X, that enables to frame the image in Y and that enables to accept any given focal length of any selected field (angle) of view lens subassembly 64 without re-configuring the camera housing 12.

Figure 5:
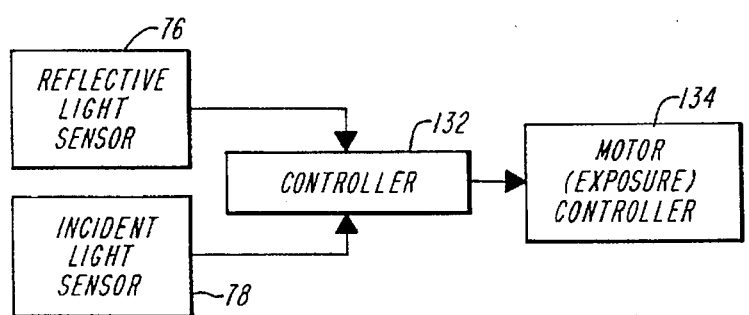
FIG. 5 is a functional block diagram of one embodiment of an ambient light responsive controller useful with any of the presently preferred embodiments of a panoramic camera or other panoramic camera in accord with the present invention.

Referring now to FIG. 5, generally designated at 130 is a functional block diagram of an ambient light responsive controller useful with any of the presently preferred embodiments of a panoramic camera or other panoramic camera in accord with the present invention. The controller 130 includes a reflective light sensor 76 mounted to the front wall of the camera housing and/or an incident light sensor 78 mounted to the rear wall of the camera housing of any embodiment of any panoramic camera in accord with the present invention.

Figures 6A, 6B, 6C:
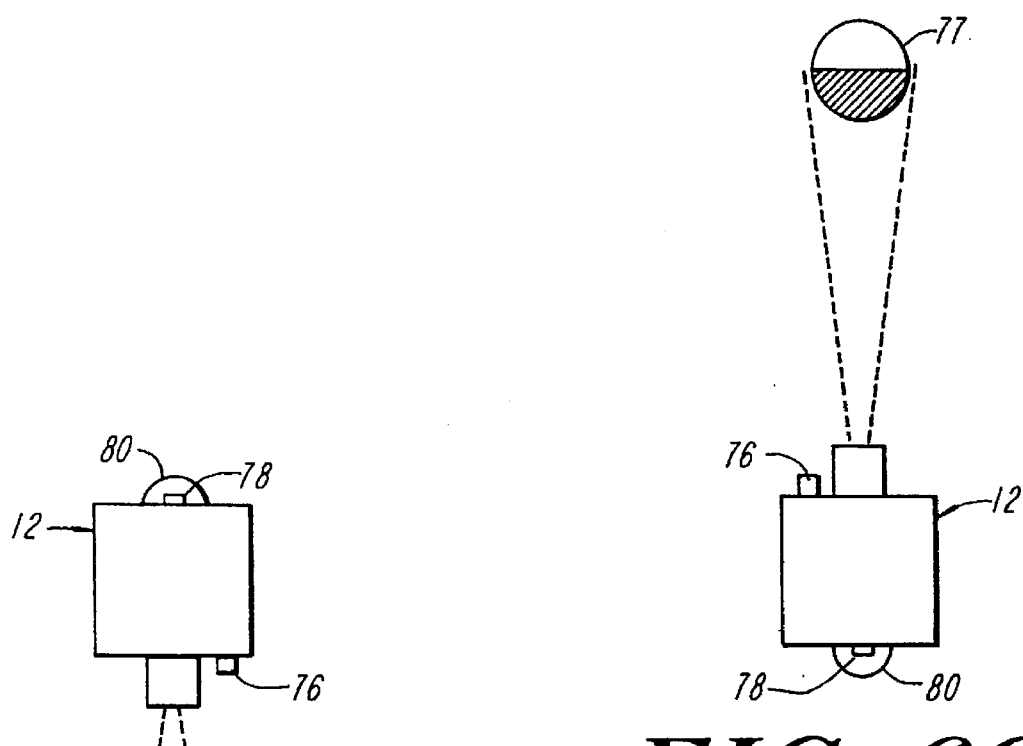
FIG. 6 illustrates plan pictorial diagrams in the FIGS. 6A,6B,6C thereof that are useful in explaining the operation of the ambient light responsive controller of a panoramic camera in accord with the present invention.

The reflected light sensor 76 mounted to the front wall of the camera housing is oriented to always measure the intensity of the light reflected by the subject 77. As shown in FIGS. 6A, 6B, 6C by the matching shading on the subject 77 and dome 80, the ambient sensor 78 on the back wall of any presently preferred embodiment or other camera in accord with the inventive concepts is always oriented so as to sample ambient light corresponding to that on the side of the subject facing the camera. It will be appreciated that the incident light sensor need not be mounted on the back wall of the camera housing so long as it is oriented to face away from the pointing direction of the camera in the diametrically opposite direction. It will also be appreciated that the reflected light sensor need not be mounted on the front wall of the camera housing so long as it faces in the same direction that the camera points.

In an alternative embodiment where a motor housing is provided separate from the camera chassis, a light sensor may be affixed to the end of a stationary, hollow axle to avoid the use of a signal noise generating commutator. The stationary, hollow axle extends to the top wall of the camera housing and to the bottom wall of the motor housing. A gear mounted to the camera chassis is driven by a motor in the motor housing such that the camera chassis is rotatably driven about the stationary, hollow axle. The light sensor at the top end of the stationary, hollow axle is electrically connected to a motor controller to be described by passing the electrical wires therefrom through the passageway provided by the hollow axle. The light sensor at the top end of the stationary, hollow axle is covered by an interchangeable light modifying member affixed to and rotating with the camera chassis. The aforementioned light modifying member may comprise a diffusion dome with half of its surface opaqued so as to admit ambient light from one side to provide an incident light sensor system, or a specular member mounted so as to direct reflected light from the scene down to the light sensor to provide a reflected light sensor system, or a combination employing a beam splitter to reflect object rays to the light sensor (photocell) from a small opening in the opaque side of the dome while transmitting incident light from the translucent side of the dome to provide an incident and reflected light sensor system.

On a typical cloudless daylight scene, proper exposure may vary by as much as three (3) stops, or a factor of eight (8), across a three hundred and sixty degree (360) pan, which variation is beyond the exposure latitude of the film. Furthermore, this variation varies as a function of ambient lighting conditions and cloud conditions, the elevation of the sun, and artificial light, among other things. It also may vary during the course of a long exposure. By mounting the incident light sensor so that it is always oriented to sample light corresponding to that on the side of the subject facing the camera, these and other problems are eliminated. Moreover, the diffusion dome 80, that takes in light from a broad angle, eliminates abrupt changes in speed (or other exposure control technique) that may be due to localized bright spots. Furthermore, in the case of backlighting of translucent objects where transmitted light becomes a factor, a correcting input as described below may be gained by mixing in the signal from the reflected light sensor. In general, in scenes involving physical blockages of light, such as a cave, a correcting input from the reflected light sensor serves to boost exposure for unusually dark areas of the scene.

Returning now to FIG. 5, the output signal(s) from the sensors 76,78 is (are) fed to a controller 132, and a motor or other controller 134 is connected to the output of the controller 132. The controller 132 provides a signal to the motor controller 134 in response to the output signal(s) of the sensors 76,78 to vary the angular velocity of the camera so that the exposure time is inversely proportional to light intensity and is adjusted continuously during rotation for the wide latitude of brightness encountered across a typical panoramic scene thereby always ensuring the correct exposure and therewith eliminating both under- and overexposure. In alternate embodiments, the sensors 76,78 may be used singly or in combination, and any suitable weighting of the output signals thereof may be employed when used in combination, without departing from the inventive concepts. In alternative embodiments, the exposure may be continually adjusted other than by varying the angular velocity such as by controllably changing the diaphragm of the lens, or by controllably changing the width of the exposure slit, without departing from the inventive concepts.

Many modifications of the instant invention may be made without departing from the scope of the appended claims.

What is claimed is:

1. A panoramic camera providing automatic exposure control, comprising:

a camera housing;

an optical assembly including a lens mounted to said camera housing and having an optical axis that points along a linear direction;

means for sweeping said linear direction that said optical axis points about a panoramic field of view;

means cooperative with said lens for exposing images of a panoramic subject as said optical axis of said optical assembly is swept about said panoramic field of view;

means for providing a signal representative of ambient lighting conditions relative to the angular phase of the panoramic field of view as said optical axis of said optical assembly is swept about its panoramic field of view; and means cooperative with said images exposing means for controllably varying the exposure in dependence on said signal as said optical axis of said optical assembly is swept about said panoramic field of view;

wherein said signal providing means includes a light sensor;

wherein said exposure varying means includes a controller responsive to said signal providing means; and wherein said sweeping means includes a motor and wherein said controller is responsive to said signal to vary the angular velocity of the sweep about said panoramic field of view.

2. The invention of claim 1, wherein said light sensor is an incident light sensor that faces in the opposite direction that said lens subassembly faces.

3. The invention of claim 1, wherein said light sensor is a reflected light sensor that faces in the same direction that said lens subassembly faces.

4. An automatic exposure camera, comprising:

a camera housing;

a lens mounted to said camera housing to face along a predetermined direction;

means mounted to said camera housing and cooperative with said lens for recording images;

an incident light sensor so mounted to said camera housing that it provides a signal representative of ambient light conditions along a direction that is diametrically opposite to said predetermined direction that said lens faces;

means coupled to said light sensor for controlling the exposure of said images recorded by said recording means in dependence on said signal representative of ambient light conditions; and means for rotating said camera housing about an axis of rotation, and wherein said controlling means includes means coupled to said rotating means for varying the speed of rotation of the camera housing in dependence on said signal.

5. The invention of claim 4, wherein said camera housing has a rear wall, and wherein said sensor is mounted thereto.

6. The invention of claim 4, wherein said speed of rotation is varied in direct relation to the magnitude of said signal.

7. A panoramic camera, comprising:

a camera chassis having a top wall and a drive member;

a motor housing having a support, a motor and a motor controller, which housing is separate from the camera chassis;

a stationary, hollow axle defining a passageway and extending between the top wall of the camera chassis and the support of the motor housing;

a light sensor mounted to said stationary, hollow axle for providing a signal representative of ambient light conditions;

said drive member of said camera chassis is driven by said motor of said motor housing such that the camera chassis is rotatably driven about the stationary, hollow axle;

said light sensor mounted to said stationary, hollow axle is electrically connected to said motor controller through the passageway provided by the hollow axle; and said motor controller is responsive to said signal representative of ambient light conditions provided by said light sensor for controllably varying the speed of rotation of said camera chassis in dependence on said signal.

8. The invention of claim 7, further including an interchangeable light modifying member affixed to and rotating with the camera chassis and confronting said light sensor.

9. The invention of claim 8, wherein said light modifying member includes a diffusion dome with about one-half of its surface opaqued so as to admit ambient light from one side so as to provide an incident light sensor system.

10. The invention of claim 7, further including a specular member to direct reflected light to the light sensor so as to provide a reflected light sensor.

11. The invention of claim 7, further including an interchangeable light modifying member having an apertured opaque region and a translucent region that is affixed to and rotating with the camera chassis and confronting said light sensor, and a beam splitter to reflect object rays to the light sensor from said apertured opaque region of the light modifying member, while transmitting incident light from the translucent region thereof, so as to provide both an incident and a reflected light sensor.

* * * * *